No. 890,581. PATENTED JUNE 9, 1908.

M. H. WOOD.

VENTILATOR FOR HORSE BLANKETS AND OTHER COVERINGS.

APPLICATION FILED AUG. 6, 1907.

Inventor

M.H.Wood,

Witnesses

W. N. Woodson

By

Attorneys

THE NORRIS PETERS CO., WASHINGTON, D. C.

UNITED STATES PATENT OFFICE.

MARK H. WOOD, OF PROVIDENCE, RHODE ISLAND, ASSIGNOR TO HARRIE S. WOOD, OF PROVIDENCE, RHODE ISLAND.

VENTILATOR FOR HORSE-BLANKETS AND OTHER COVERINGS.

No. 890,581. Specification of Letters Patent. Patented June 9, 1908.

Application filed August 6, 1907. Serial No. 387,350.

*To all whom it may concern:*

Be it known that I, MARK H. WOOD, citizen of the United States, residing at Providence, in the county of Providence and State of Rhode Island, have invented certain new and useful Improvements in Ventilators for Horse-Blankets and other Coverings, of which the following is a specification.

This invention has for its object an improved ventilator for horse covers or blankets and other coverings, which is so constructed, that it will effectually exclude rain, and at the same time create the necessary circulation of air and thus prevent the overheating of the horse when driving.

With this and other objects in view, as will more fully appear as the specification proceeds, the invention consists in certain constructions and arrangements of parts hereinafter described and claimed.

Figure 1:
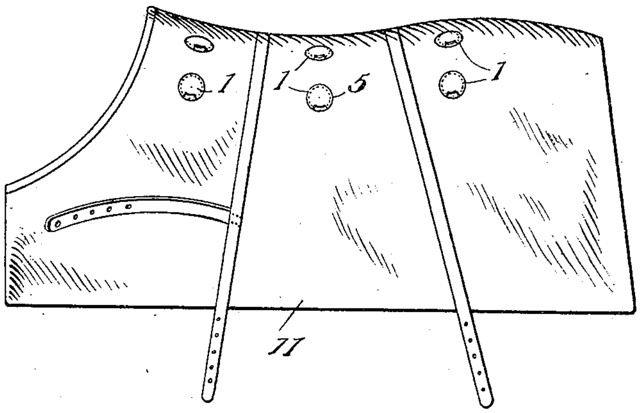
Figure 2:
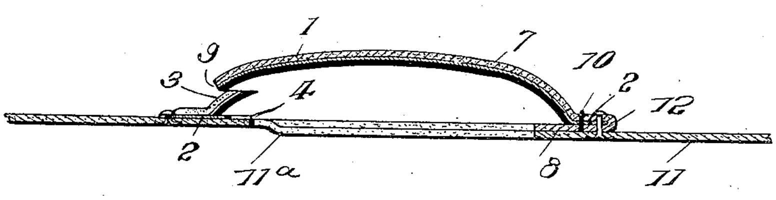
Figure 3:
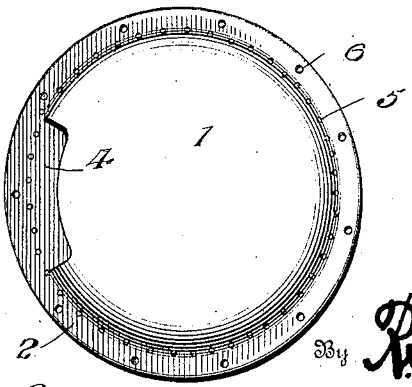

For a full description of the invention and the merits thereof and also to acquire a knowledge of the details of construction of the means for effecting the result, reference is to be had to the following description and accompanying drawings, in which:

Figure 1 is a view showing one application of my ventilating device for coverings: Fig. 2 is a detail view of one of the ventilators, the view being in section and on an enlarged scale, and Fig. 3 is a top plan view.

Corresponding and like parts are referred to in the following description and indicated in all the views of the drawings by the same reference characters.

My improved ventilator comprises preferably a sheet metal disk 1, which is slightly arched or of dome shape as shown and is provided with a rim 2. The disk 1 is formed with one or more slots 3, a single slot being shown in the present instance, and the metal which is stamped out to form the slot 3 is bent inwardly, preferably in the same plane, as the rim 2, so as to form an inwardly projecting tongue 4 at one side of the slot. Any number of these disks 1 may be employed according to the requirements of the particular case or according to taste or judgment.

In the preferred arrangement of attaching the disks the said disks are provided with a circular series of comparatively closely grouped apertures 5 at the base of the rim and with another series of apertures 6 near the edge of the rim. The cloth 7 or the like which is designed to cover the disk is cut to the required shape and of the required size, and has one edge lapped over the rim of the disk as indicated at 8, but is cut away as indicated at 9, coincident with the slot 3. A line of stitching 10 is then run through the apertures 5 so as to secure the fabric or the like to the disk, and the covered disk is then secured to the blanket 11 or other covering by means of a row of rivets 12 secured in the apertures 6.

The blanket 11 or other covering to which the disk or disks are applied is formed with a cut out portion $11^a$ underneath the disk. It is manifest that the disks themselves as well as their coverings and the blankets or the like to which they are attached may be made of any material.

From the foregoing description in connection with the accompanying drawing, it is obvious that I have provided a very cheap and simple ventilator for horse blankets and other coverings, which will allow a circulation of air to reach the body of the animal while, at the same time, the animal is kept warm and that when the ventilator is applied to stable or night blankets, it will allow the heated perspiration caused by hard labor and driving to pass off and the horse to dry warm, without the usual chilly effect caused by the cold and dampness and consequent weakness and illness, which accompanies and is a result of the use of a close unventilated blanket.

It is obvious that the invention is not limited to use as a ventilator for horse blankets, as it may be applied with equal efficiency to rubber coats and other water proof garments, to supply the necessary ventilation which is lacking, owing to the closeness of fiber or character of the material of which the garment is composed, and that it may be also used, in miniature for such garments as well as for head gear.

It is to be particularly noted that the tongue 4 will serve as a guard for the slot 3 and prevent the flesh of the animal from swelling up or closing the slot, which might occur if the tongue were not used in the position where it at all times will hold the hide away from the slot and permit the proper ventilation or circulation to be maintained.

Having thus described the invention, what is claimed as new is:—

A covering provided with a ventilating opening therein, a dome-like disk formed with an outstanding attaching rim encircling said opening and with a ventilating slot, the rim being formed with a circular series of relatively closely grouped apertures at its base and beyond said series with another series of apertures, a piece of material extending over the outer surface of the disk, except the slot thereof and lapped under the attaching rim, stitching inserted through the rim and the lapped under edges of said material, such stitching extending through the inner series of apertures, and rivets or the like extending through the covering and through the said under-lapped edge of the material as well as the outer series of apertures, as and for the purpose set forth.

In testimony whereof I affix my signature in presence of two witnesses.

MARK H. WOOD.

Witnesses:
ADA G. JOHNSON,
JOSEPH E. SPINK.